(12) United States Patent  (10) Patent No.: US 6,645,602 B2
Gerber  (45) Date of Patent: Nov. 11, 2003

(54) METHOD FOR MAKING EMBOSSED PACKAGES AND OTHER ARTICLES FROM SHEET MATERIALS, BLANKS MADE THEREBY, AND SHEET MATERIALS FOR USE THEREWITH

(75) Inventor: David J. Gerber, Clinton, CT (US)

(73) Assignee: Gerber Scientific Products, Inc., Manchester, CT (US)

( * ) Notice: Subject to any disclaimer, the term of this patent is extended or adjusted under 35 U.S.C. 154(b) by 0 days.

(21) Appl. No.: 09/948,617

(22) Filed: Sep. 7, 2001

(65) Prior Publication Data
US 2002/0058125 A1 May 16, 2002

Related U.S. Application Data

(62) Division of application No. 09/536,312, filed on Mar. 27, 2000, now Pat. No. 6,506,324.

(51) Int. Cl.[7] ................................. B32B 3/24
(52) U.S. Cl. ...................... 428/138; 428/131; 428/156; 428/172; 428/192; 226/87; 226/76
(58) Field of Search ................. 428/131, 156, 428/138, 192, 172; 226/87, 76

(56) References Cited

U.S. PATENT DOCUMENTS

| 5,213,656 A | 5/1993 | Lis | 156/630 |
|---|---|---|---|
| 5,537,135 A | 7/1996 | Hevenor | 347/171 |
| 5,551,786 A | 9/1996 | Webster | 400/616.3 |
| 5,555,009 A | 9/1996 | Hevenor | 347/198 |
| 5,575,099 A | 11/1996 | Strobel | 40/584 |
| 5,598,202 A | 1/1997 | Peterson | 367/213 |
| 5,841,464 A | 11/1998 | Phillips | 347/253 |
| 5,868,507 A | 2/1999 | Thomas | 400/616 |
| 6,002,416 A | 12/1999 | Gerber | 347/176 |
| 6,364,983 B1 * | 4/2002 | Kay | 156/230 |

FOREIGN PATENT DOCUMENTS

| DE | 39 26578 C1 | 7/1990 |
|---|---|---|
| DE | 41 39 415 A1 | 6/1992 |
| DE | 199 10 019 A1 | 1/2000 |

* cited by examiner

Primary Examiner—William P. Watkins, III
(74) Attorney, Agent, or Firm—McCormick, Paulding & Huber LLP

(57) ABSTRACT

A method and work material for making embossed blanks for sample packages and other free-standing three dimensional display items from a sheet-type work material includes a printer for printing a graphic image on the work material, and a processing mechanism for performing work operations on the work material. The sheet-type work material has a top layer of sheet material, an intermediate layer of sheet material, and a carrier layer of sheet material, with a first layer of adhesive material bonding the top and intermediate layers of sheet material together, and a second layer of adhesive material bonding the intermediate and carrier layers of sheet material together. Any, all, or a combination of the top, intermediate, or carrier layers of sheet material may have shape retaining deformability characteristics to aid in holding an embossed design in the work material. In operation, the printer prints an image onto the work material, which is then advanced to the processing mechanism where a creaser places indented fold lines into the work material, a knife cuts the blank from the work material, and an embosser, moving in either a rasterwise or vectorial motion, embosses a design into the work material. The blank can then be removed from the work material and erected into a package or other free-standing three dimensional display item.

2 Claims, 6 Drawing Sheets

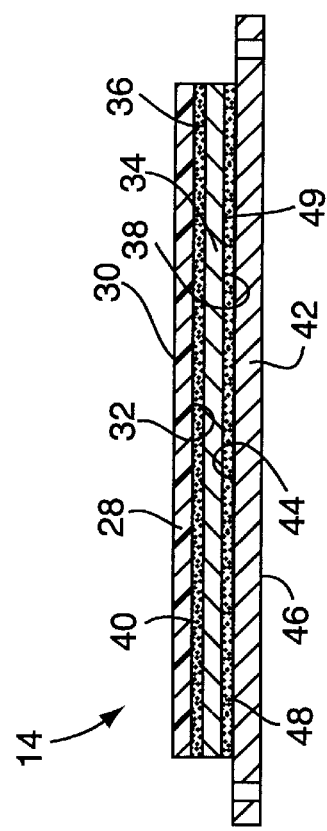
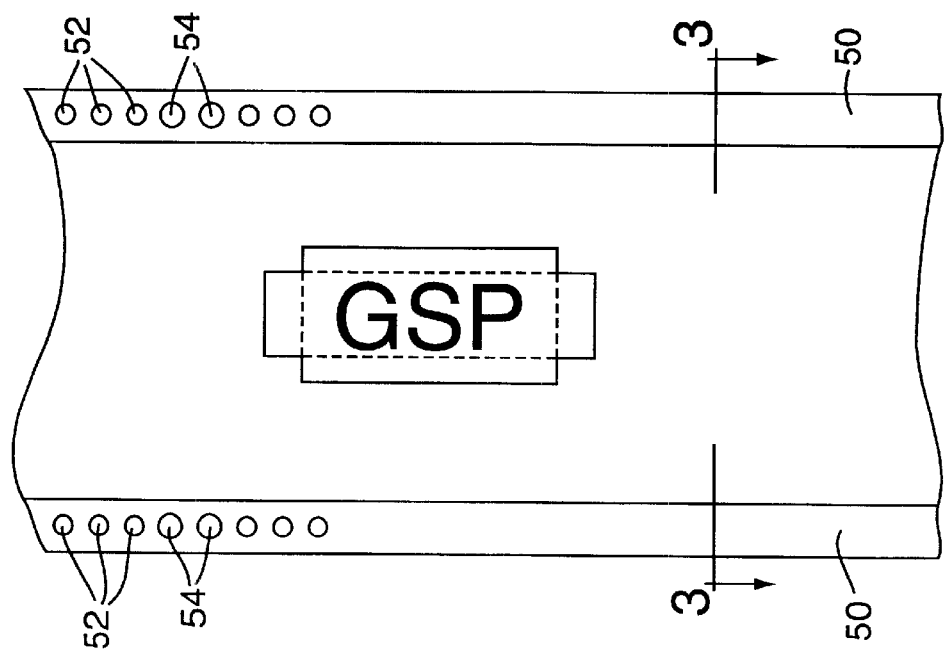

METHOD FOR MAKING EMBOSSED PACKAGES AND OTHER ARTICLES FROM SHEET MATERIALS, BLANKS MADE THEREBY, AND SHEET MATERIALS FOR USE THEREWITH

This application is a Divisional of Ser. No. 09/536,312, filed Mar. 27, 2000, now U.S. Pat. No. 6,506,324.

FIELD OF THE INVENTION

The present invention relates generally to the embossing of sheet material, and deals more particularly with a method for making embossed packages and other articles from sheet-type work materials, as well as with the articles themselves, embossed blanks for making the articles, and the sheet materials used to make the embossed blanks.

BACKGROUND OF THE INVENTION

The present invention has particular utility in the making of embossed sample packaging from sheet-type work materials and is described herein as applied to such use. It also, however, can be used in the making of many other kinds of embossed articles such as the free-standing three-dimensional special menus often found on restaurant tables.

Therefore as used herein, the term "package" should be broadly construed to mean sample packaging from sheet-type work materials as well as other kinds of three dimensional articles.

Prior to releasing a new product to the marketplace, companies typically evaluate the functional aspects and aesthetic appeal of the new product's packaging. To facilitate this evaluation, prototypical packages referred to as comprehensives are created embodying in detail the package design concepts.

A difficulty associated with known techniques for making sample packages is due in part to the fact that the graphics and special effects employed by companies on their product packaging have risen to such a level of sophistication that approaches of greater complexity and novelty are continually being investigated in attempts to produce packages more eye-catching or appealing than those of the competition. One such special effect is to provide packages with embossed designs on their exterior surfaces.

Embossing is a technique that produces raised or depressed sections on a surface in accordance with the shape and contours of the desired design. Known embossing techniques typically utilize a pair of dies having the design to be embossed found in them, one die generally being the negative of the other. When the pair of dies are brought together under pressure, with a piece of work material between them, the design is transferred to the work material by deforming the material in the region of the design away from the original plane. A drawback associated with this technique is that the embossing dies tend to be costly and generally cannot be altered. If each comprehensive being evaluated in the above-described process contained a different embossed design, a set of embossing dies corresponding to each design would be required to produce the sample packages. In addition, a comprehensive may go through several design iterations during the evaluation process with each iteration potentially requiring another pair of dies. Accordingly, due to the expense involved in die-making, the use of embossing dies to produce embossed designs on comprehensives is impractical.

In addition to the foregoing, embossed designs often include special optical characteristics to increase the visual impact of the package on potential purchasers. However, most known sample package making processes use standard cardboard as the basic work material. Therefore, if the final product package is to include any special physical or optical effects, such as metallic or holographic effects, the samples must either have these materials applied over the embossed design by hand, or the final appearance of the product must be partially left to the imagination.

Accordingly, it is the general object of the present invention to provide an embossing apparatus and method for producing embossed designs amenable to the comprehensive production and evaluation process.

It is a more specific object of the present invention to provide a material capable of being effectively embossed and having the optical and/or physical characteristics required on the finished, production package.

Other objects and advantages of the invention will be apparent from the following detailed description of preferred embodiments of the invention.

SUMMARY OF THE INVENTION

The present invention meets these and other objects by providing a method and material for making embossed blanks from sheet-type work materials. The method comprises the steps of defining a design to be embossed and the section on the work material where the design is to be located, in machine readable embossing data. The work material is then presented to a processing mechanism having a resilient surface upon which the work material is located during an embossing operation. An embosser having an end defining an embossing surface is loaded into the processing mechanism, and the processing mechanism is operated to cause the embossing surface to engage the work material in the area where the design is to be embossed, thereby pressing the work material into the processing mechanism's resilient surface. The processing mechanism is then operated to move the embosser over the area to be embossed in a rasterwise and/or vectorial motion in accordance with the aforementioned embossing data, thereby producing a pattern of deformations in the work material corresponding to the shape and contours of the embossed design.

The present invention also resides in providing a work material having a top layer of sheet material that contributes shape retaining deformability characteristics to the work material whereby the top layer of sheet material is strained, due to the force exerted by the embossing surface on the work material during the aforementioned embossing operation, to such an extent that the deformation is irreversible in the top layer of sheet material. As such, the pattern of deformations produced in the work material during the embossing operation are permanently set into the work material due to the shape retention characteristics of the top layer of sheet material. The top layer of sheet material also includes a first upper work surface and a second lower opposite surface. An intermediate layer of sheet material is located below the top layer of sheet material and has a third upper surface and a fourth lower surface. A first layer of adhesive material is interposed between and in communication with the second and third surfaces thereby bonding the top layer of sheet material to the intermediate layer of sheet material. A carrier layer of sheet material is also included and has a fifth upper surface and a sixth lower surface. A second layer of adhesive material is interposed between and in communication with the fourth and fifth surfaces thereby bonding the intermediate layer of sheet material to the carrier layer of sheet material.

The present invention further resides in the sheet-type work material as described above where any, all, or a combination of the top, intermediate, or carrier layers of sheet material contribute the previously described shape retaining deformability characteristics thereby aiding in holding the embossed design in the work material.

The present invention also provides embossed blanks, created using the processes and materials described above, which can subsequently be erected into sample packages or other articles.

BRIEF DESCRIPTION OF THE DRAWINGS

A more complete understanding of the invention and many of the attendant advantages thereto will be readily appreciated from the following detailed description when considered in conjunction with the accompanying drawings wherein corresponding reference characters indicate corresponding parts throughout the several views of the drawings and wherein:

FIG. 2 is a partial top plan view of a work material for use with the system illustrated in FIG. 1;

FIG. 3 is a sectional view of the work material taken along the line 3—3 of FIG. 2;

DETAILED DESCRIPTION OF THE PREFERRED EMBODIMENT

Figure 1:
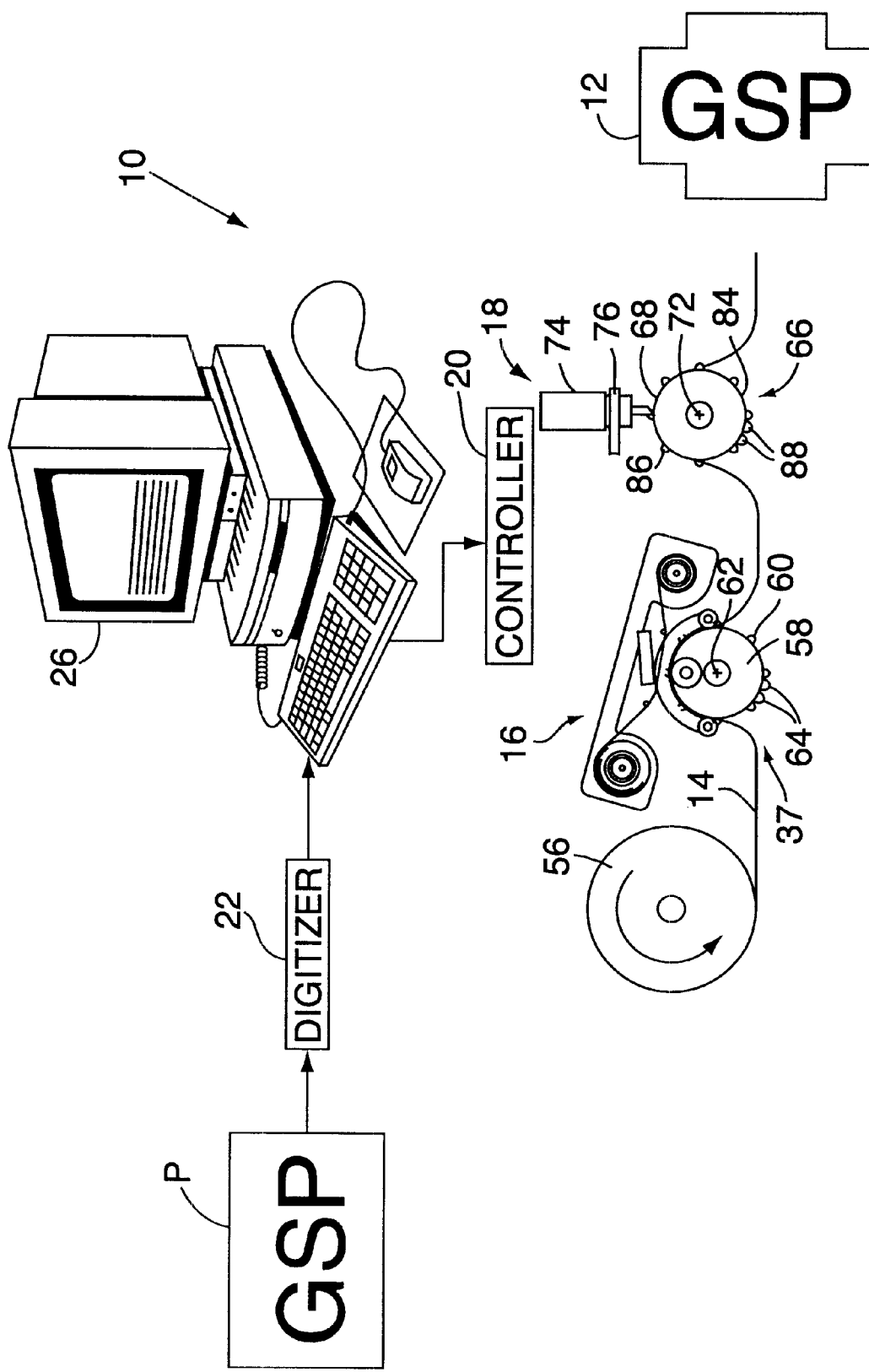
FIG. 1 is a schematic view of an apparatus for printing and performing work operations on a sheet-type work material embodying the present invention.

Turning to the drawings and first referring to FIG. 1, the preferred embodiment of an apparatus is there shown, and is generally designated as 10, for making embossed blanks 12 from a sheet-type work material 14. The apparatus 10 includes a printer 16 for receiving and printing a graphic on the work material 14, and a processing mechanism 18 for performing work operations on the work material. The printer 16 and the processing mechanism 18 are controlled during operation by a controller 20 that generates command signals corresponding to the printing and various work operations to be carried out on the work material 14 in the production of the blank 12.

To further facilitate the printing, as well as the work operations to be performed on the work material 14 in the production of the blank 12, the apparatus 10 also includes a digitizer 22 or other data input device which supplies a computer 26 with machine readable data defining the graphic to be printed, and the shape and characteristics of the blank 12. The computer 26 then generates a printing and processing program which is read by the controller 20 and converted into machine readable printing and processing data. As described above, the printer 16 and the processing mechanism 18 operate in response to the command signals received from the controller 20 corresponding to the printing and processing data.

The work material 14 used to produce the blanks 12 is shown in FIGS. 2 and 3 and is preferably in the form of a laminate comprising, a top layer of sheet material 28 having a first upper work surface 30 and a second lower opposite surface 32. An intermediate layer of sheet material 34 is located below the top layer of sheet material and includes a third upper surface 36 and a fourth lower surface 38. A first layer of adhesive material 40 is interposed between and in communication with the second and third surfaces, 32 and 36 respectively, thereby bonding the top layer of sheet material 28 to the intermediate layer of sheet material 34. A carrier layer of sheet material 42 is located below the intermediate layer of sheet material 34 and has a fifth upper surface 44 and a sixth lower surface 46. A second layer of adhesive material 48 is interposed between and in communication with the fourth and fifth surfaces 38 and 44 respectively, thereby bonding the intermediate layer of sheet material 34 to the carrier layer of sheet material 42. In the preferred embodiment of the present invention, the top layer of sheet material 28 is made from a material suitable for printing, such as, but not limited to, vinyl or mylar, and may also exhibit various physical and/or optical characteristics, such as transparent, holographic, prismatic, pearlescent, fluorescent, metallic, matte, or glossy properties. Additionally, the top layer of sheet material 28 can exhibit shape retaining deformation characteristics, whereby when the top layer of sheet material is strained, as a result of the force exerted by the embosser on the work material during an embossing operation, the top layer of sheet material is irreversibly deformed. As such, the pattern of deformations produced during the embossing operation are permanently set into the work material 14 due to the above-described shape retaining deformation characteristics. The intermediate layer of sheet material 34 is preferably composed of a material having structural characteristics that are suitable for making packages, such as, but not limited to cardboard. Additionally, and similar to the top layer of sheet material, the intermediate layer of sheet material can also exhibit the previously described shape retaining deformation characteristics, thereby aiding in holding the embossed design in the work material 14. As will be explained in detail hereinafter, depending on the manner by which the work material is to be embossed, the above-described carrier layer of sheet material 42 can be either flexible, or can also exhibit shape retaining deformation characteristics.

Referring to FIG. 3, the carrier layer of sheet material 42 includes opposed lateral edge portions 50, 50 which contain a plurality of registration holes 52, 52 and keying holes 54, 54. The purpose of the registration holes 52, 52 and the keying holes 54, 54 will be explained in detail below.

As best seen in FIG. 1, the blank 12 is produced by first advancing the work material, preferably fed from a roll 56, to the printer 16 where the graphic p is printed onto the first upper work surface 28. The work material 14 is advanced through the printer 16 by a first advancing means 37 which preferably, and as shown, comprises a pair of sprockets 58, 58 (one shown), each carrying a plurality of equally spaced circumferential driving teeth or pins 60 projecting radially outwardly from the axis 62 and adapted to be cooperable with the registration holes 52, 52 in the lateral edge portions of the carrier layer of sheet material 42. In addition to the driving pins 60, 60, the drive sprockets each also carry two enlarged keying pins 64, 64 adapted to be cooperable with the keying holes 54, 54 of the work material 14. The keying pins 64, 64 are located on a portion of the periphery of the drive sprockets 58, 58. The pair of keying pins 64, 64 stand out from the driving pins 60, 60 because the keying pins 64, 64, are larger and spaced closer to each other than are the driving pins 60, 60. The keying pins 64, 64 visually identify laterally aligned portions of the sprockets 58, 58 to aid an operator in loading the sheet material correctly. Thus, as the sprockets 58, 58 are rotatably driven by a suitable means, such as a motor, about the axis 62 in response to commands from the controller 20 corresponding to the printing data, the driving pins 60, 60 and the keying pins 64, 64 cooperate with the registration holes 52, 52 and the keying holes 54, 54 in the work material 14 to advance the work material in a first coordinate direction longitudinal of itself beneath the printer 16. While the first advancing means 37 has been shown and described as a sprocket drive, the invention is not limited in this regard, and any suitable advancing means, such as a friction drive may be substituted without departing from the broader aspects of the present invention.

Figure 4:
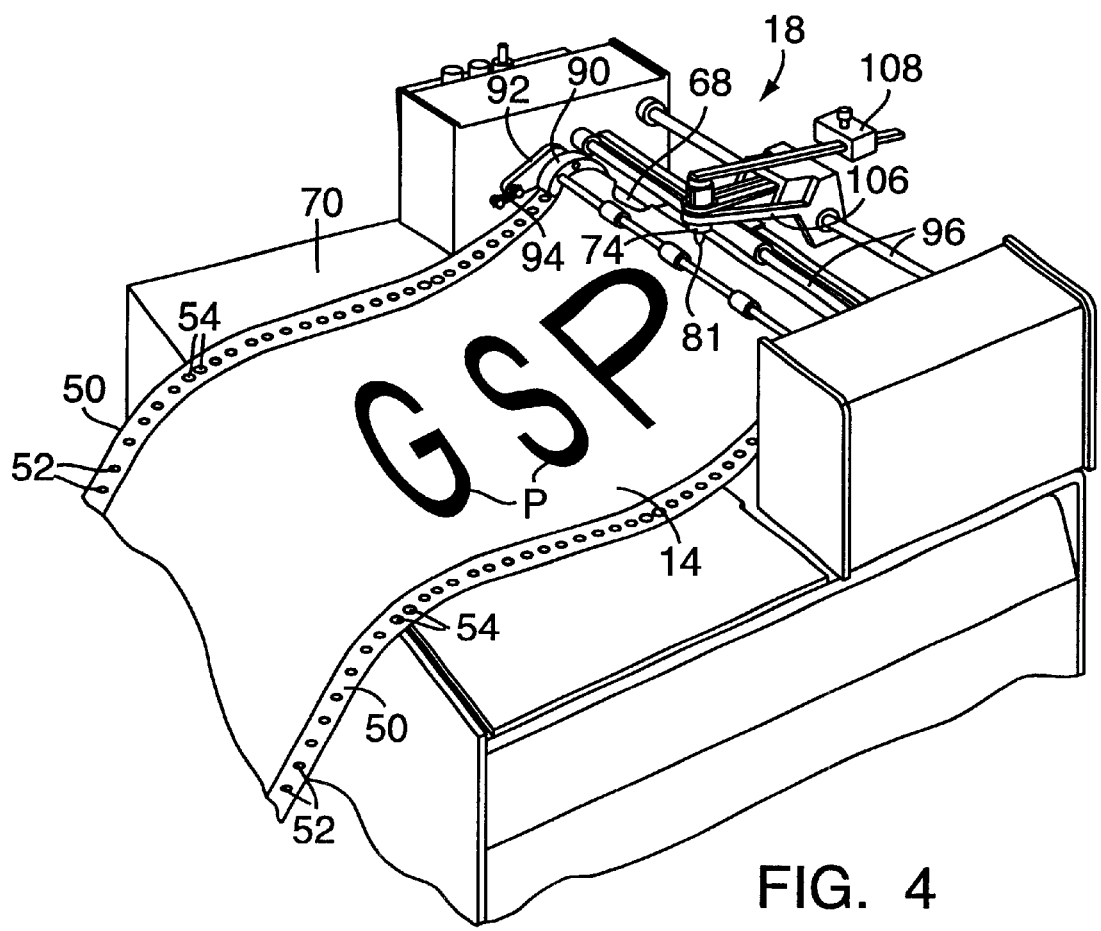
FIG. 4 is a perspective view of a processing mechanism which forms a part of the system shown in FIG. 1 with a cutter installed.
Figure 5:
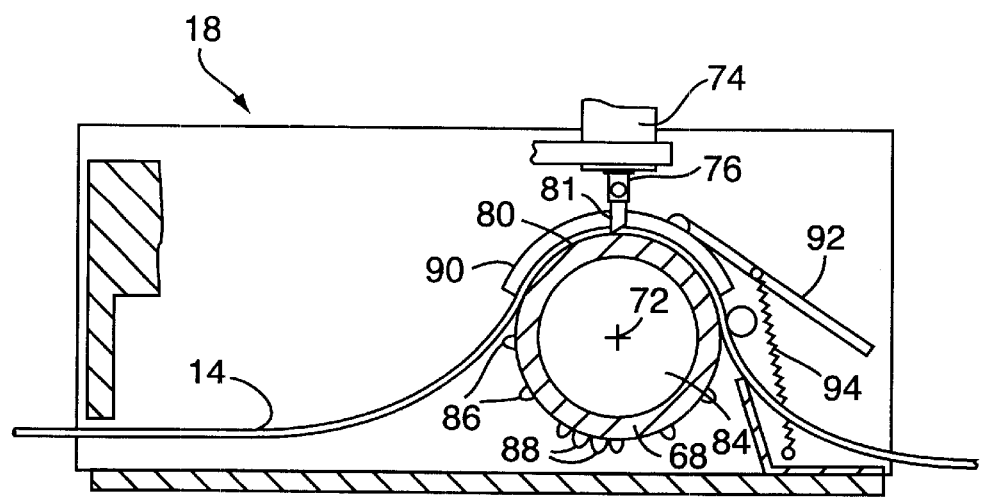
FIG. 5 is a fragmentary sectional view of the processing mechanism shown in FIG. 4 with a cutter installed.
Figure 6:
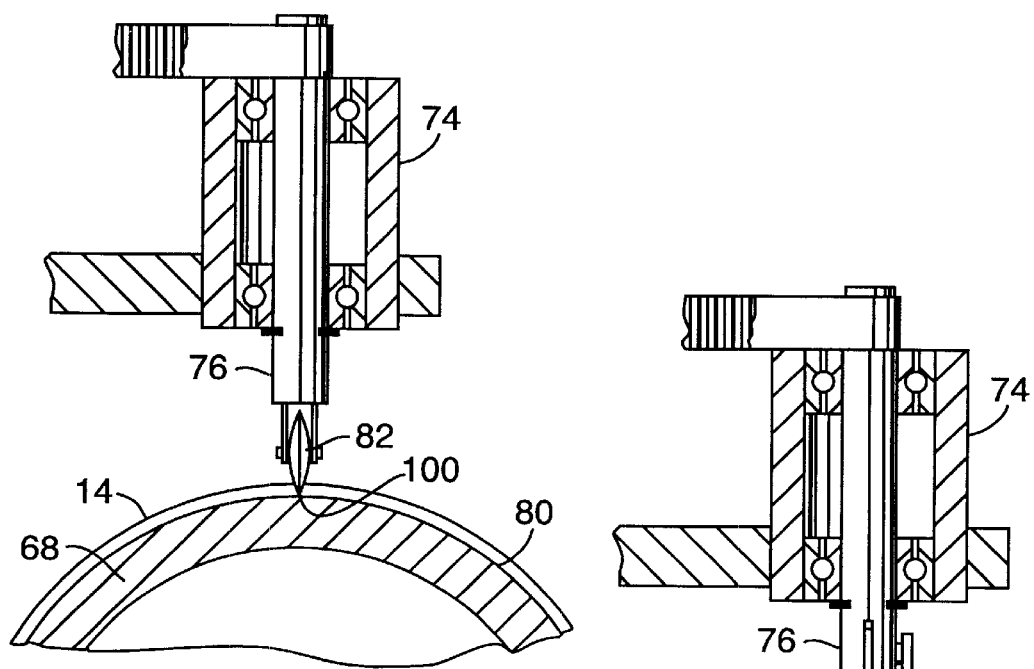
FIG. 6 is a fragmentary sectional view of the processing mechanism shown in FIG. 4 with a creaser installed.
Figure 7:
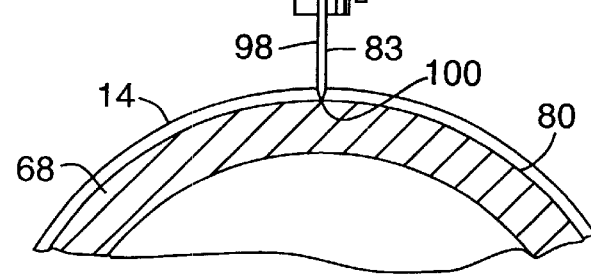
FIG. 7 is a fragmentary sectional view of the processing mechanism shown in FIG. 4 with an embosser installed.

Subsequent to printing the graphic P, and referring to FIGS. 4 and 5, the work material 14 is advanced to the processing mechanism 18 by a second advancing means 66. The processing mechanism 18 comprises a platen 68 preferably in the form of a roller rotatably mounted to a frame 70 for rotation about an axis 72, a tool head 74, and at least one associated tool holder 76 are rotatably mounted to the tool head 74. The roller 68 has a resilient outer cylindrical surface 80. At least three processing tools herein shown as, but not limited to, a cutter 81, creaser 82, shown in FIG. 6, and an embosser 83, shown in FIG. 7, are supportable by the tool holder 76 for performing the previously mentioned work operations.

The aforementioned second advancing means 66 is similar to the first advancing means 37, and functions to move the work material 14 through the processing mechanism 18 in accordance with commands issued from the controller 20. The second advancing means 66 consists of a sprocket pair 84, 84 rotatably driven by a suitable means, such as a motor, about an axis of rotation 72 in response to commands issued from the controller 20. The sprockets 84, 84 are defined by a series of equally spaced circumferential teeth or pins 86, 86 and also include a pair of keying pins 88, 88 projecting radially outwardly from the axis 72. The pins 86, 86 are adapted to be cooperable with the registration holes 52, 52 and the keying holes 54, 54 along the lateral edge portions 50, 50 of the work material 14 as shown in FIG. 3. The sprockets 84, 84 are integral with the roller 68. To maintain coaction of the sheet material lateral edge portions 50, 50 with each of the drive sprockets 84, 84 an associated arcuate clamp 90 is provided and connected to the frame 70 by a pivotal support arm 92 biased toward the involved sprocket by a spring 94 drawing the clamp 90 against the work material 14 as it is advanced through the processing mechanism 18. While the second advancing means is shown and described as a sprocket drive, the invention is not limited in this regard as any suitable drive means, such as a friction drive may be substituted without departing from the broader aspects of the present invention.

Referring to FIG. 4, the tool head 74 is pivotally and slidably mounted on ways 96 which are fixed to the frame 70. As such, during a work operation, as the work material 14 is advanced by the second advancing means 66, the tool head 74 can traverse the width of the first upper work surface 30 of the work material 14. Additionally, the tool holder 76 and one of the aforementioned processing tools 81, 82, or 83 can move between a lowered working position, as shown in FIG. 4, with the processing tool pressed against the work material 14, or the processing tool can be raised off of the work material 14 to a non-working position perpendicular to the work material 14.

In the preferred embodiment of the method of the present invention, the work operations performed by the processing mechanism 18 consist of creasing, cutting, and embossing operations. In a creasing operation, the locations of indented fold lines to be pressed into the work material 14 are defined in machine readable creasing data. As best seen in FIG. 7, the creaser 82 is brought into pressing engagement with the work material 14 and the processing mechanism is operated to move the creaser 82 over the work material 14 between the lowered working and raised non-working positions, thereby placing predetermined indented fold lines in the work material in response to commands issued from the controller corresponding to the creasing data. The creaser 82 has a work engaging surface which is either stationary, or rotatable in the tool holder. In one case, the creaser 82 is a rigid member fixed to the tool holder, in another, the creaser 82 comprises a wheel rotatable relative to the tool holder. In addition to creasing operations, in some instances the creaser 82 can be used to also perform embossing operations. In addition, the creaser can be configured such that it can simultaneously place at least two indented fold lines, into the work material 14.

In a cutting operation, the cutter 81, shown in FIG. 5, engages the work material 14 at a predetermined location, and the processing mechanism 18 is operated in response to the previously mentioned processing data to cause the cutter to cut around the periphery of the blank 12 at a controlled depth of penetration, as explained below.

In addition to the cutting and creasing operations described above, the present invention further resides in the processing mechanism's ability to emboss designs onto the work material in accordance with commands issued from the controller 20 corresponding to machine readable embossing data. To facilitate an embossing operation, the shape and contours of the design to be embossed, as well as the positional relationship of the design relative to the peripheral edges of the blank 12, FIG. 1, are input into the computer 26, which generates and transfers an embossing program in the form of the above-referenced machine readable embossing data to the controller 20.

Figure 8:
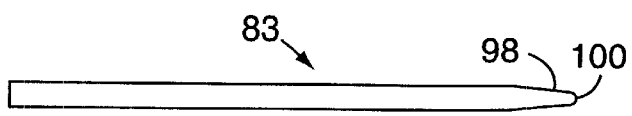
FIG. 8 is a front elevational view of the embosser of FIG. 7.
Figure 9:
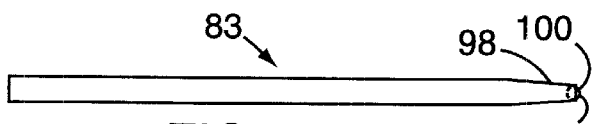
FIG. 9 is a front elevational view of an alternate embodiment of the embosser of FIG. 7.

In order to perform the embossing operation in response to the embossing data, the processing mechanism 18 must have an embosser 83 loaded into it. An embosser of the preferred type is illustrated in FIG. 8, and has an end 98 defining a rounded embossing surface 100. Alternately, as shown in FIG. 9, the embosser 83 can include a rotatable ball 102 held captive in the embossing surface 100 similar to the rotatable balls used in ball-point pens.

The embossed design is transferred onto the work material 14 by the embosser 83 via the coaction of the second advancing means 66 which moves the work material 14 back and forth relative to the embosser 83 in a first direction longitudinal of itself, and the tool head 74 which traverses the work material 14 in a second direction perpendicular to the first direction. As the tool head 74 traverses the sheet material 14, it also moves between the raised and lowered positions in response to commands issued from the controller 20. As best seen in FIG. 7, when in the lowered position, the embossing surface 100 engages the sheet material 14, pressing it into the resilient outer surface 80 carried on the roller 68, thereby creating a pattern of deformations in the sheet material corresponding to the embossed design, in accordance with the previously described embossing data.

Figure 10:
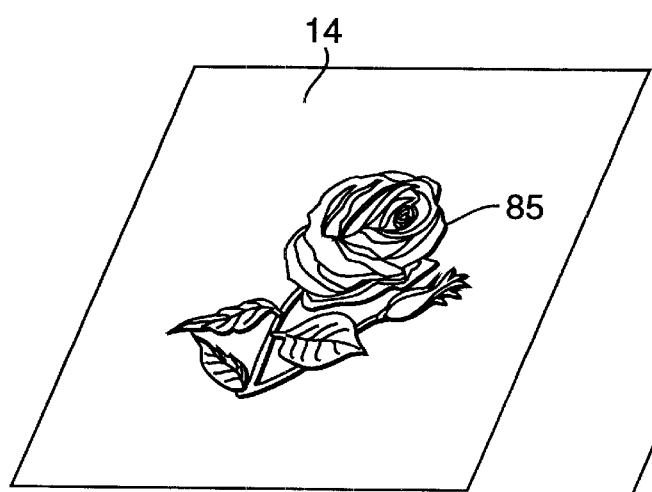
FIG. 10 is a perspective view of an embossed design wherein the embosser was moved in a rasterwise pattern.
Figure 11:
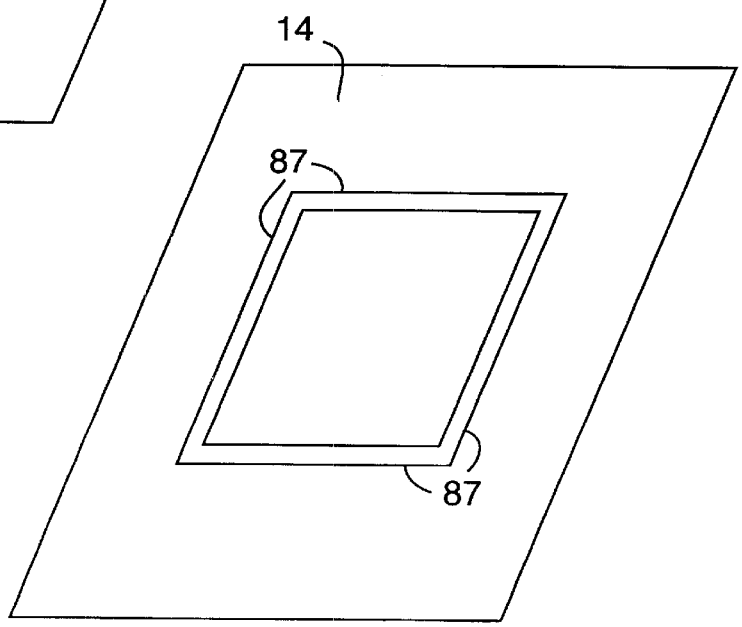
FIG. 11 is a perspective view of an embossed design wherein the embosser was moved in a vectorial pattern.

Referring to FIGS. 10 and 11 and depending on the shape and contours of the embossed design, the embosser 83 can be moved in a rasterwise motion, thereby filling in selected areal portions of the design, best understood with reference to FIG. 10, or the embosser 83 can be moved vectorially along selected interior or peripheral edge portions of the design to provide definition to those portions as is illustrated in FIG. 11. In addition the embossed design could involve a combination of rasterwise and vectorial motion.

Figure 12:
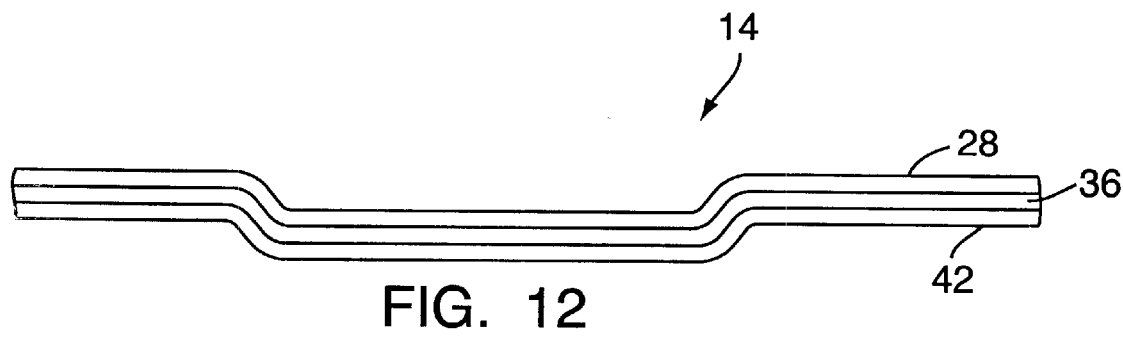
FIG. 12 shows a negatively embossed design on a sheet-type work material.
Figure 13:
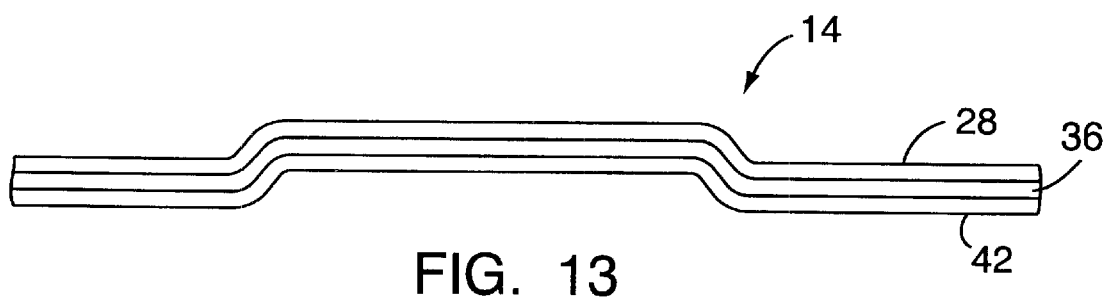
FIG. 13 shows a positively embossed design on a sheet-type work material.

By changing the manner in which the work material 14 is presented to the processing mechanism 18, different embossed effects can be created in the work material. For example, referring to FIG. 12, if the work material 14 is presented to the processing mechanism 18 such that the embossing surface 100 engages the first upper work surface 30 of the work material 14, a negatively embossed design will be produced. With respect to the present invention, the blank 12 is negatively embossed when the embossed design consists of a pattern of deformations in the work material 14 extending from the first upper work surface 30 toward the carrier layer of sheet material 42, FIG. 3. Conversely, as best seen in FIG. 13, a positively embossed design is created when the work material 14 is presented to the processing mechanism 18 such that the embossing surface 100 engages the carrier layer of sheet material 42, thereby causing the pattern of indentations to extend from the carrier layer of sheet material 42 toward the first upper work surface 30. When viewed from the first upper work surface 30, the positively embossed design is raised with respect to the surrounding sections of the work material 14. In addition, a hybrid embossed design is also anticipated by the present invention and consists of positively and negatively embossed areal portions of the same design.

Referring to FIG. 4, to aid in the accomplishment of the aforementioned creasing, cutting, and embossing operations, the processing mechanism 18 is cantilevered outwardly from the ways 104 on an arm 106 and may include a mechanical device having a variable tensioning spring mechanism for selectively applying discreet amounts of downward force to the work material 14 through the tool holder 76. Alternatively, a variably positionable counterweight 108 can be mounted to the tool head 74 to vary the amount of downward pressure applied by the cutter, creaser, or embosser, 81, 82 and 83 respectively, to the work material 14. Thus, the depth of penetration of the cutter, creaser, or embosser, 81, 82 and 83, into the work material 14, can be adjusted and held at a substantially constant value. In general, the maximum depth of penetration of the cutter 81 is such that during a cutting operation, the work material 14 is cut through the top and intermediate layers of sheet material 28 and 34 only and not through the full extent of the sheet material's thickness, thereby leaving the carrier layer of sheet material 42 intact. Due to the presence of the first and second layers of adhesive material 40 and 48 respectively, the blank is held in place during the work operations described above, as well as during those described hereinafter. Additionally, a release surface 49 is carried by the fourth lower surface 38 that allows the intermediate layer of sheet material 34 to be peeled away from the carrier layer of sheet material 42, while the second layer of adhesive material 48 remains adhered to the carrier layer of sheet material 42. In this manner, the blank can be easily removed from the work material subsequent to the completion of the aforementioned work operation.

Referring to FIG. 1, an embossed blank is made from the work material 14 in accordance with the following steps. The work material 14 is drawn from the supply roll 56 to the printer 16, by the first advancing means 37 where a graphic P is printed onto the first upper work surface 30 of the work material 14 in response to commands issued from the controller 20 corresponding to machine readable printing data. Next, the work material with the graphic printed thereon is advanced to the processing mechanism 18 by the second advancing means 66. A creaser 82, shown in FIG. 7, is loaded into the processing mechanism 18, and indented fold lines are pressed into the work material 14 by operating the processing mechanism 18 in response to commands issued from the controller corresponding to machine readable creasing data. Next, a cutter 81, seen best in FIG. 5, is loaded into the processing mechanism 18, which is then operated to cause the cutter 81 to cut through the work material 14 down to the carrier layer 42, around the periphery of the blank 12 in response to commands issued from the controller corresponding to machine readable cutting data.

The embosser 83, shown in FIG. 7, is then loaded into the processing mechanism 18 which is operated to either negatively, positively, or negatively and positively emboss a design into the work material 14. Depending on whether or not the carrier layer of sheet material 42 defines the previously-described shape retaining deformability characteristics whereby the carrier layer of sheet material 42 is irreversibly deformed causing the embossed design to be permanently set into the work material 14. The process for making the embossed blank may also include cutting through the carrier layer of sheet material 42 only around the periphery of the embossed design such that when the blank 12 is peeled from the work material 14, the cut portion of the carrier layer 42 stays with the blank 12. Finally, the blank 12 can be peeled away from the carrier layer of sheet material 42 and erected into a package.

While the steps in the foregoing blank production method have been described as occurring in a particular sequence, the invention is not limited in this regard. Due to the fact that the blank 12 is held to the carrier layer 42 by the previously described second layer of adhesive material 48, during the described printing and work operations, the sequence by which the printing and work operations occur can be varied. Therefore, while the embossed blank 12 has been described above as being created by printing, creasing, cutting, and embossing, in that order, the present invention is not limited in this regard as any of these operations may precede or follow any other operation.

While preferred embodiments have been shown and described, various modifications and substitutions may be made without departing from the spirit and scope of the present invention. Accordingly, it is to be understood that the present invention has been described by way of example, and not by limitation.

What is claimed is:

1. An embossable sheet-type work material comprising:
   a top layer of sheet material being irreversibly deformable thereby allowing an embossed design to be permanently set into said work material, said top layer further having a first upper work surface and a second lower opposite surface;
   at least one intermediate layer of sheet material located below said top layer of sheet material and having a third upper surface and a fourth lower surface;

a first layer of adhesive material interposed between and in communication with said second and third surfaces thereby bonding said top layer of sheet material to said intermediate layer of sheet material;

a flexible carrier layer of sheet material having a fifth upper surface and a sixth lower surface, wherein said carrier layer of sheet material includes opposed lateral edge portions defining a plurality of registration holes and opposed keying holes that are larger than said registration holes; and a second layer of adhesive material interposed between and in communication with said fourth and fifth surfaces thereby bonding said intermediate layer of sheet material to said flexible carrier layer of sheet material.

2. An embossable sheet-type work material comprising:

a top layer of sheet material having a first upper work surface and a second lower opposite surface;

at least one intermediate layer of sheet material located below said top layer of sheet material and having a third upper surface and a fourth lower surface;

a first layer of adhesive material interposed between and in communication with said second and third surfaces thereby bonding said top layer of sheet material to said intermediate layer of sheet material;

a carrier layer of sheet material being irreversibly deformable thereby allowing an embossed design to be permanently set into said work material, said carrier layer of sheet material further having a fifth upper surface and a sixth lower surface, and wherein said carrier layer of sheet material includes opposed lateral edge portions defining a plurality of registration holes and opposed keying holes that are larger than said registration holes; and a second layer of adhesive material interposed between and in communication with said fourth and fifth surfaces thereby bonding said intermediate layer of sheet material to said carrier layer of sheet material.

* * * * *